United States Patent [19]
Anderson

[11] Patent Number: 5,317,839
[45] Date of Patent: Jun. 7, 1994

[54] FOUR-WAY DIAMOND FILE

[76] Inventor: Steven P. Anderson, 6660 Reseda Blvd. #112, Reseda, Calif. 91335

[21] Appl. No.: 280

[22] Filed: Jan. 4, 1993

[51] Int. Cl.⁵ .................. B24D 15/02; B23D 71/04
[52] U.S. Cl. ...................... 51/205 WG; 51/211 R; 29/78; 29/80
[58] Field of Search ............... 29/78, 80; 51/205 WG, 51/211 R, 391, 392

[56] References Cited

U.S. PATENT DOCUMENTS

| 128,957 | 7/1872 | Fisher | 51/205 WG |
|---|---|---|---|
| 633,523 | 9/1899 | Lytle | 29/78 |
| 1,083,297 | 1/1914 | Richardson | 29/78 |
| 1,694,229 | 12/1928 | Nestor | 29/78 |
| 1,954,742 | 4/1934 | McSwain et al. | 51/391 |
| 2,308,624 | 1/1943 | Pouech | 51/211 R |
| 2,379,569 | 7/1945 | Ellis | 51/211 R |
| 3,369,283 | 2/1968 | Colding | 51/211 R |
| 4,584,745 | 4/1986 | Seiber | 29/78 |

FOREIGN PATENT DOCUMENTS 375630  10/1939  Italy ........................................ 29/78

Primary Examiner—William E. Terrell
Attorney, Agent, or Firm—Albert O. Cota

[57] ABSTRACT

A four-way diamond file (10) consisting of an elongated file base (12) having a narrow center section (14) that allows a user to easily grasp and maneuver the file (10) in difficult to reach areas. Integrally attached to each end of the center section (14) is a right substrate section (16) and a left substrate section (30). To the first and second sides of these substrate sections is attached a multiplicity of diamond particles (26). Up to four grades of diamond dispersed work surfaces, ranging from coarse to medium fine, can be provided to allow a variety of sharpening and shaping tasks to be performed. The file (10) includes provisions to allow the file to be secured to a portable work platform (52).

6 Claims, 3 Drawing Sheets

FOUR-WAY DIAMOND FILE

TECHNICAL FIELD

The invention pertains to the general field of hand-held files and planars and more particularly to a diamond file that can be made with up to four different grades of abrasive work surfaces.

BACKGROUND ART

Files in current use are available in a variety of shapes and in varying grades of abrasive surfaces. Generally, these files are made with an abrasive surface consisting of a continuous run of teeth which are adapted for filing in only one direction. This type of file cannot simply be turned to use the other half because the teeth will be running in the wrong direction. Other files are made with an abrasive surface consisting of various grid grades of dispersed diamond particles. These files for the most part, have a flat elongated shape, a uniform thickness and have an abrasive surface consisting of one continuous grade of diamond grid. In some files, the upper side may have one abrasive grade and the bottom side another grade and some have two different grades on the same side.

A single file having four different grades of abrasive surfaces, two on each side, was not found in the prior art. Those files that did incorporate two grades of abrasive surfaces on one side were not offset above the longitudinal plane of the file base. By having the abrasive surfaces offset above the files longitudinal plane, as does the instant invention, better control is achieved since only the abrasive surface touches the area needing sharpening or shaping.

The prior art also did not disclose a file with a narrow non-abrasive center section having a pair of bores therethrough. The center section allows the file to be easily held and maneuvered in difficult to reach areas. The two bores, allow the file to be secured firmly to a work platform; or alternatively, to secure the file to one of the holes to allow the file to be rotated when necessary or, to attach a handle.

A search of the prior art did not disclose any patents that read directly on the claims of the instant invention, however, the following U.S. patents were considered related:

| U.S. Pat. No. | INVENTOR | ISSUED |
| --- | --- | --- |
| 4,584,745 | Seiber | 29 April 1986 |
| 3,369,283 | Colding | 20 February 1968 |
| 2,687,562 | Noll | 31 August 1954 |
| 2,308,624 | Pouech | 19 January 1943 |
| 633,523 | Lytle | 19 September 1899 |

The Seiber patent discloses a file for sharpening saw teeth. The file includes a flattened oblong cross section having two sets of single cut teeth that extend over the file's longitudinal axis. A first set of teeth extends from a central lateral axis outward toward one end of the file; and a second set of teeth extends from the central axis outward towards the file's second end. The placement of the teeth allows the file to have an extensor cutting stroke using either end.

The Colding and Pouech patents each disclose methods for producing files having diamond particle abrasive surfaces.

The Colding patent discloses a cutting insert for chip cutting that consists of a metallic matrix with diamond particles. The particles cover at least ten percent of the edge surface. The diamond particles may be pressed in place or sprayed into the matrix, which is then hardened.

The Noll patent discloses a file especially suited to reconditioning disc type electrodes as used in welding machines. The file includes an elongated body of substantially uniform thickness. The body has a concave surface and is divided intermediate its ends into two working faces. Each working face has an arcuate, substantially parallel teeth that extend crosswise of the body and from centers approximately coincident with the longitudinal axis of the body. Each tooth of each working face has its cutting edge on the outer side of the arc and is directed towards the respective end of the body that defines one end of the corresponding working face.

The Pouech patent discloses a resilient nail file. The file has a metallic blank to a portion of which is adhesively secured diamond particles to form an abrasive surface. The adhesive is of a flexible type to permit the normal flexing of the resilient file without disrupting the adhesive with the consequent release of the diamond particles.

The Lytle patent discloses a horse hoof planar. The planar has a set of main teeth and auxiliary teeth or slits. Each of the main teeth consists of a vertical front face, an oblique rear face that meets the front face at the cutting edge, which extends transversely across the planar. The planar includes a curved or rounded throat between the front face of one tooth and the rear face of the next tooth in advance. This grooved throat causes the planing that are cut by the teeth to pass down their front walls through the grooved throats and be thrown out by the walls of the teeth next in front. Thus, the specific construction of the throats of the teeth causes the planar to be self clearing.

DISCLOSURE OF THE INVENTION

The four-way diamond file is designed to preferably have four different grades of diamond-grid abrasive surfaces-two on its upper surface and two on its lower surface. The diamond grid can be selected to provide abrasive surfaces that range from coarse to extra fine.

The file consists of an elongated file base that is preferably made of a metal, such as stainless steel. The base includes a center section that has integrally attached to each respective end a right substrate section and a left substrate section. To the first and second sides of these substrates is attached by an adhesive, such as an epoxy, a metal plate that has dispersed on its upper surface a multiplicity of diamond particles that comprise the file's abrasive work surface.

In the preferred embodiment, the substrate sections extend inwardly from the respective first and second surfaces of the center section. When the diamond impregnated metal plates are attached, their abrasive surfaces extend above the longitudinal plane of the center section. Thus, only the diamond particles make contact with the work piece. Also, each substrate extends laterally from the respective longitudinal edges of the center section. This offset provides a larger work surface and allows the sides of the abrasive surfaces to be more accessible. Each corner of the terminus end of each of the substrate sections is rounded to allow a user to hold the file in his or her hand and operate it with little or no discomfort.

The center section is made narrower than the substrate sections and has rounded edges to allow the file to be easily and comfortably grasped and to permit the file to be more maneuverable when being used in tight and difficult to reach areas. The center section also includes a pair of longitudinally spaced bores. These bores are sized to accept and hold an optional handle or to fit over a pair of pegs located on an optional, portable work platform. The handle allows the user to apply additional pressure to the surface being worked. The work platform provides a convenient way to quickly and easily attach and remove the file from a flat work surface where the work piece is better worked by moving the work piece against the stationary work surface of the file. Alternatively, the bores can be used to secure the file to any work surface by means of a nut/bolt combination.

In view of the above disclosure, it is the primary object of the invention to provide an ergonomically designed four-way diamond file that can be used to comfortably and effectively perform a variety of filing and planing operations.

In addition to the primary object of the invention, it is also an object to provide a four-way diamond file that:

can be made in various sizes,
can be used for deburring, notching, dressing, honing and other operations,
can be designed with four work surfaces having identical diamond-grid work surfaces or having sequential diamond-grid surfaces that range from coarse to medium fine,
can be hand held or secured to a working platform,
has long lasting qualities, and
is cost-effective to both the manufacturer and the consumer.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
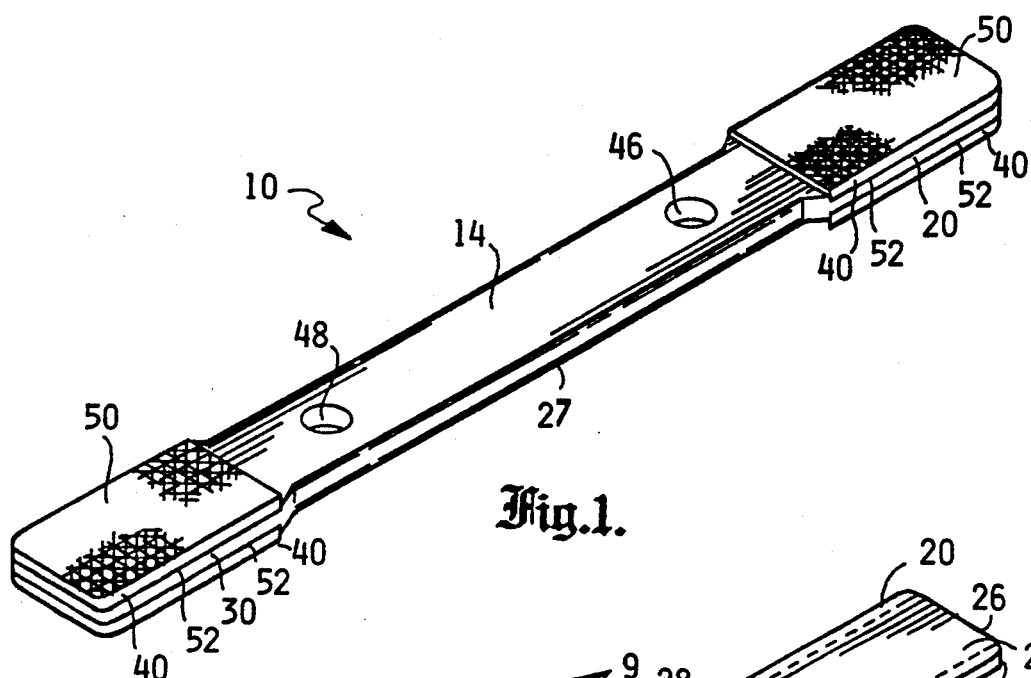
FIG. 1 is a perspective view of the four-way diamond file.

The best mode for carrying out the four-way diamond file, is presented in terms of a preferred embodiment. The file can be hand-held or be secured to a work surface and can be manufactured with up to four grades of diamond work surfaces.

The preferred embodiments of the four-way diamond file 10, as shown in FIGS. 1 through 12, is comprised of the following major elements: an elongated file base 12, a center section 14 having an integral right substrate section 20 and left substrate section 30, and a set of metal plates 40 having attached to their upper surfaces a multiplicity of diamond particles 50. With the basic invention a portable work platform 70 and a handle 80 may be utilized to enhance the utility of the invention.

Figure 2:
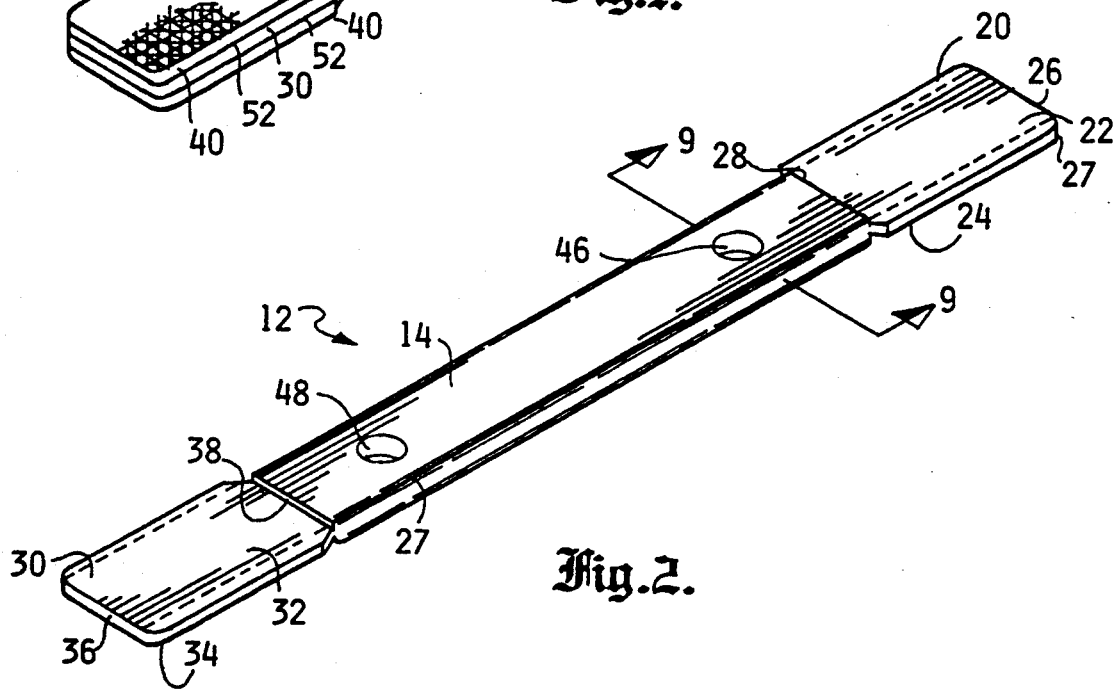
FIG. 2 is a perspective view showing one side of the elongated file base.

The completed four-way diamond file 10, is shown in a perspective view in FIG. 1 and the basic elongated file base 12, is shown in a perspective view in FIG. 2. The elongated file base 12 is preferably made of stainless steel, and has an overall length of 6.25 inches (15.88 cm); the center section 14 has a width of 0.625 inches (1.59 cm) and a thickness of 0.125 inches (0.32 cm); the right and left substrates 20, 30 have a width of 0.75 inches (1.91 cm) and in the preferred embodiment as shown in FIG. 2, are stepped inwardly and have a thickness of 0.105 inches (0.27 cm).

The right and left substrate sections 20, 30 are an integral element of the center section 14 as shown in FIG. 2. The right substrate section 20 has a first side 22, a second side 24, an outward terminus 26, and an inward end 28. Likewise, the left substrate section 30 has a first side 32, a second side 34, an outward terminus 36, and an inward end 38.

As shown by the dashed lines in FIG. 2, both the right and left substrate sections 20, 30 may be made with there longitudinal edges in alignment with the respective longitudinal edges of the center section 14. However, in the preferred embodiment, the longitudinal edges extend slightly laterally from the respective longitudinal edge of the center section 14 as best shown in the top view of FIG. 3. This extended area allows a wider work surface and produces a better balanced file. Additionally, as also best shown in FIG. 3, each corner of the outward terminus 26, 36 have rounded corners 27 to allow a person to hold the file 10 in his or her hand and operate it with little or no discomfort.

Figure 4:
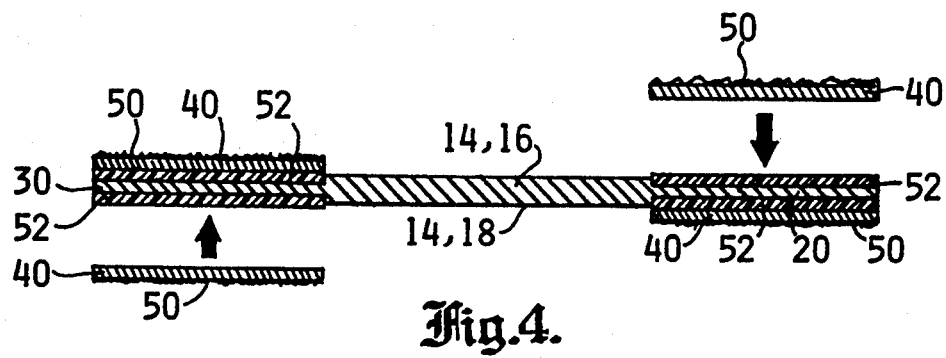
FIG. 4 is a side, cross-sectional view showing right and left substrate sections that are stepped inwardly and having metal plates attached.
Figure 5:
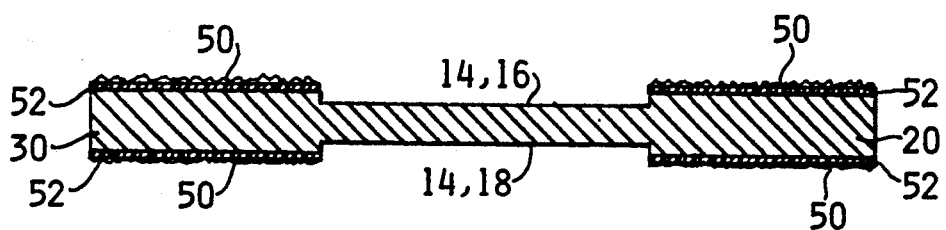
FIG. 5 is a side, cross-sectional view showing right and left substrate sections that are stepped outwardly with diamond particles attached directly to the surface of the substrates.

In the preferred embodiment, the first and second sides of the right and left substrates 20, 30 as best shown in FIGS. 2 and 4, are stepped inwardly from the respective first and second surfaces 16, 18 of the center section 14. Each of the stepped areas function to accept a metal plate 40 that has attached a multiplicity of diamond particles 50 which form the file's abrasive surface. The inward step is approximately 0.03 inches (0.079 cm) so that when the two plates 40 are attached, they extend above the respective plane of the center section 14 as shown in FIG. 4. Alternatively, the first and second sides of the left and right substrates 20, 30 as shown in FIG. 5, may be stepped outwardly from the respective plane of the center section 14. In this alternate design, the diamond particles 50 are attached directly to the first and second sides of the right and left substrates 20, 30 by an adhesive 52 as also shown in FIG. 5. This adhesive should provide a degree of flexibility to permit the normal flexing of the file without disrupting the adhesive with consequent release of the diamond particles.

Figure 6:
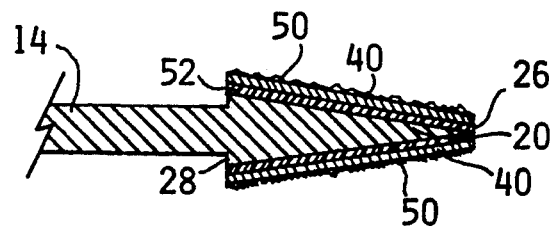
FIG. 6 is a partial, cross-sectional view of the file with a substrate that is longitudinally tapered to allow the file to be used in narrow, tight working areas.

In either design, the abrasive surface of the file 10 extends above the plane of the center section 14. Thus, allowing only the diamond particles to touch the area being worked. As shown in FIG. 6, one or both of the substrates 20, 30 may also be longitudinally tapered toward the terminus of the substrates. This taper adds utility to the file 10 by allowing the file to be used in narrow, tight working areas.

The quantity and grid size of the diamond particles 50 determine the grade of coarseness provided by the abrasive surfaces. In the file industry, a coarse grade would use an 80 grid, a medium coarse grade, a 120 grid, a medium grade, a 180-200 grid and a medium fine grade, a 300 grid.

In the preferred embodiment, the diamond particles 50 are attached to the surface of the metal plate 40 by an attachment means that preferably consists of a brazing process. The diamond encrusted plates are then attached to the first and second sides of the right and left substrate sections 20, 30 as shown in FIG. 4, by an adhesive 52 such as an epoxy.

Figure 7:
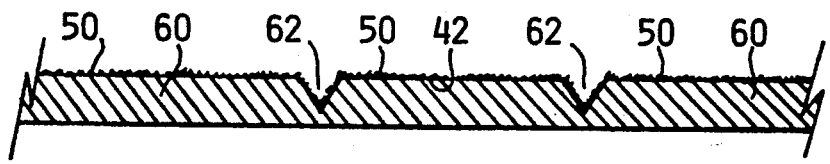
FIG. 7 is a partial, elevational end view of a scored metal strip that is scored with v-grooves at each metal plate intersection.
Figure 8:
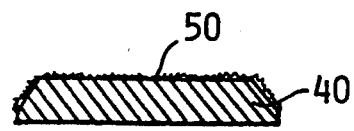
FIG. 8 is an elevational, end view of a single metal plate that has been detached from the scored metal strip of FIG. 7.

The metal plates 40 are made by initially taking a metal strip 60 as shown in FIG. 7, that has a width equal to the length of the metal plates 40 and that includes scores 62 that are made at 0.75 inch (1.91 cm) increments where each scored pair is equal to the width of the metal plate 40. As shown in FIG. 7, the scoring consists of a v-groove 62 so that when the diamond particles 50 are attached, they fill the v-groove as well as the upper surface 42 of the metal plate 40. This results in a metal plate 40 as shown in FIG. 8, that has diamond particles 50 on its side which allows the file 10 to also be used on its edges.

The diamond particles 50 may be dispersed over the first and second sides of the right and left substrate sections 20, 30 to permit the file 10 to have identical abrasive work surfaces. Preferably however, the diamond particles are dispersed over the substrate sections to provide a sequence of four abrasive work surfaces that range from coarse to medium fine. For example, the file 10 can be made to have the first side of the right substrate 20 provide a coarse work surface, the first side of the left substrate 30 to provide a medium coarse work surface; the second side of the right substrate 20 to provide a medium work surface; and the second side of the left substrate 30 to provide a medium fine work surface. This work surface design allows two different operations i.e., sharpening or shaping to be completed on one side and allows for maximum convenience to complete the job without having to turn the file over. This is especially time-effective when the file is secured to a work surface as described infra.

Figure 3:
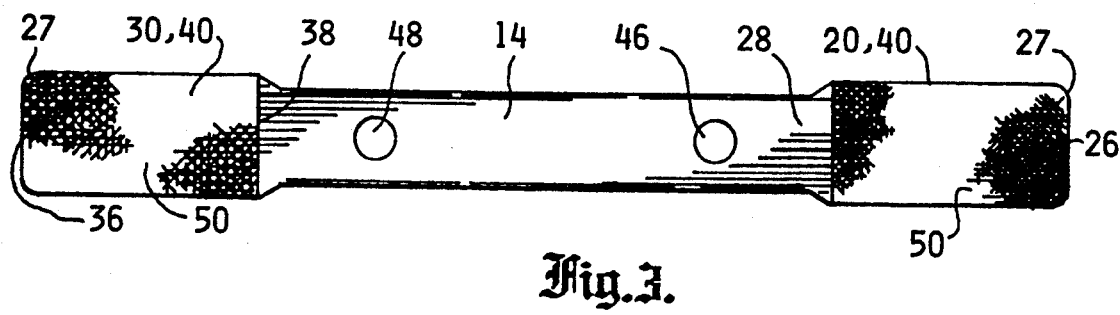
FIG. 3 is a top, plan view of the file.
Figure 9:
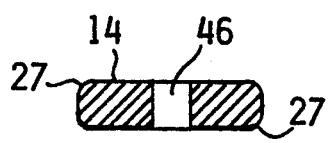
FIG. 9 is a cross-sectional view of the center section taken along the lines 9—9 of FIG. 2.
Figure 10:
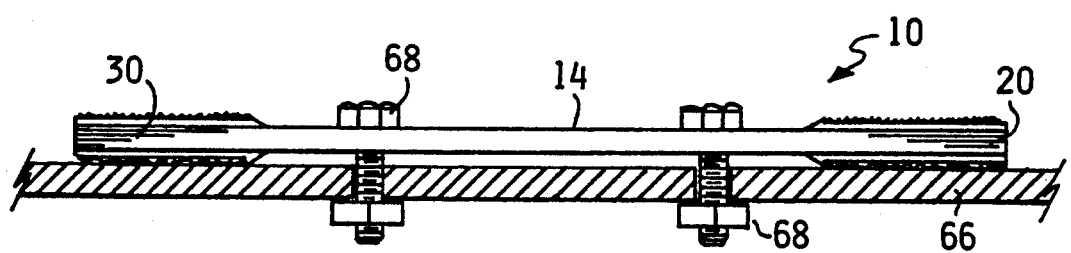
FIG. 10 is a partial, cross-sectional and elevational view showing a file bolted to a work surface.

The center section 14 which is an integral part of the elongated file base 12 is made narrower than the right and left substrate sections 20, 30. This narrow design allows the file to be easily and comfortably held to allow more maneuverability in difficult to reach areas. The center section 14 is preferably made with rounded corners 27 as shown in FIG. 9, to add to its holding comfort. As shown in FIGS. 1, 2 and 3, the center section 14 also includes in the preferred embodiment a first bore 46 located near the inward end 28 of the right substrate section 20 and a second bore 48 located near the inward end 38 of the left substrate section 30. These bores allow the file 10 to be secured firmly to a work surface 66 by means of a nut/bolt combination 68 as shown in FIG. 10. Alternatively, only one bore can be utilized which in this case would allow the file to be rotated, if necessary.

Figure 11:
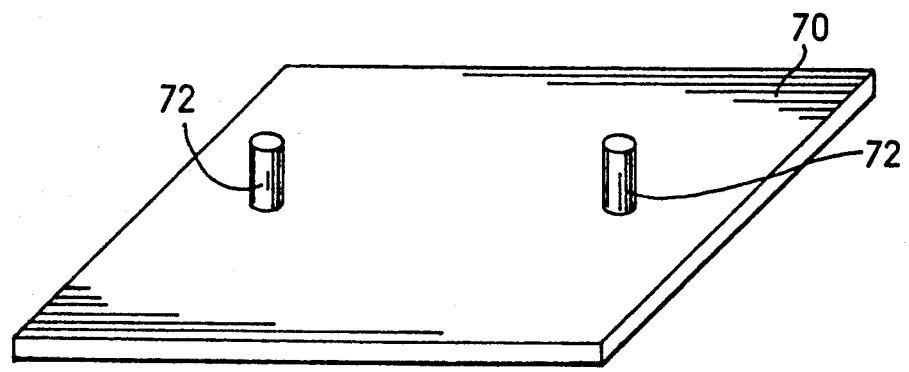
FIG. 11 is a perspective view of a portable work platform having a pair of pegs dimensioned and sized to be inserted into the bores on said center section.

The invention also includes a flat, portable work platform 70 and a handle 80. The platform 70 as shown in FIG. 11, includes a pair of upwardly extending pegs 72 that are spaced and sized to fit into the first and second bores 46, 48 on the center section 14. The pegs allow the file to be quickly inserted or removed without any fastening devices. The file 10 may be inserted into both pegs 72 to allow the file to be firmly secured, or into one peg 72 to allow the file to be rotated, if necessary.

Figure 12:
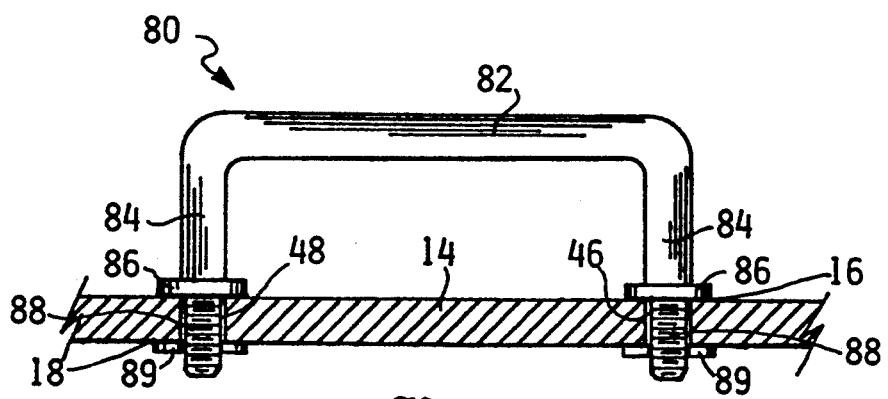
FIG. 12 is a partial, cross-sectional and elevational view showing a handle inserted into the bores on the center section.

The handle 80 as shown in FIG. 12, consists of a horizontal section 82 with downwardly projecting vertical sections 84 on each end. Near the end of each vertical section 84 is located a shoulder 86 and below the shoulder is a shallow threaded section 88. The threaded sections are spaced and sized to permit them to be inserted into the respective first and second bores 46, 48 located on the center section 14 with the bottom surface of the shoulder resting on the first surface 16 of the center section as shown in FIG. 12. Once inserted, a pair of flat nuts 89 allow the inserted threads to be tightened against the second surface 18 of the center section 14. The handle permits a user to easily manipulate the file 10 and provides additional pressure to the surface being filed.

While the invention has been described in complete detail and pictorially shown in the accompanying drawings it is not to be limited to such details, since many changes and modifications may be made to the invention without departing from the spirit and the scope thereof. Hence, it is described to cover any and all modifications and forms which may come within the language and scope of the claims.

I claim:

1. A four-way diamond file comprising:
    a) an elongated file base comprising:
        (1) a center section having rounded edges, a first surface and a second surface,
        (2) a right substrate section having a first side, a second side, an outward terminus and an inward end that is integral with said center section, where the first and second sides are stepped outwardly from the first and second surfaces respectively of said center section,
        (3) a left substrate section having a first side, a second side, an outward terminus and an inward end that is integral with said center section, where the first and second sides are stepped outwardly from the first and second surfaces respectively of said center section and
    b) a set of four metal plates, where each plate has an upper surface, a lower surface and is dimensioned to fit over a first or second side of said right and left substrate, where to the upper surface of each said plate is attached by a brazing process a selected multiplicity of diamond particles and to its bottom surface is attached an adhesive that allows a said metal plate to be bonded to each side of said right and left substrates to form a set of four abrasive work surfaces.

2. The four-way diamond file as specified in claim 1 wherein the corners of the terminus end of said right and left substrate sections are round.

3. The four-way diamond file as specified in claim 1 wherein said metal plates are formed by taking a metal strip having a top surface, a selectable length and a width that is equal to the length of said metal plate, where the metal strip is scored at increments, when each pair of increments is equal to the width of said metal plate and where the scoring is made in the shape of a v-groove which allows the multiplicity of said diamond particles to fill both the v-grooves and the top surface of said metal strip, whereupon when said metal plates are removed from said metal strip, each said metal plate has an abrasive surface on its side as well as on its upper surface.

4. The four-way diamond file as specified in claim 1 wherein said diamond particles are dispersed over the first and second sides of said right and left substrate sections to permit said file to have identical abrasive work surfaces.

5. The four-way diamond file as specified in claim 1 wherein sid diamond particle are dispersed over the first and second sides of said right and left substrate section to provide a sequence of four different abrasive work surfaces.

6. The four-way diamond file as specified in claim 5 wherein the first side of said right substrate section provides a coarse work surface, the first side of said left substrate section provides a medium coarse work surface, the second side of said right substrate provides a medium surface, and the second side of said left substrate provides a medium fine work surface.

* * * * *